Nov. 17, 1959  G. C. WHITNEY, JR  2,913,010
EXPANSION JOINT ASSEMBLY
Filed June 3, 1957  5 Sheets-Sheet 1

INVENTOR.
GILBERT C. WHITNEY, JR.
BY
ATTORNEY

INVENTOR.
GILBERT C. WHITNEY, JR.

Nov. 17, 1959  G. C. WHITNEY, JR  2,913,010
EXPANSION JOINT ASSEMBLY
Filed June 3, 1957  5 Sheets-Sheet 4

INVENTOR.
GILBERT C. WHITNEY, JR.
BY
Arthur Frederick
ATTORNEY

Patented Nov. 17, 1959

2,913,010

EXPANSION JOINT ASSEMBLY

Gilbert C. Whitney, Jr., Dansville, N.Y., assignor to Foster Wheeler Corporation, New York, N.Y., a corporation of New York Application June 3, 1957, Serial No. 663,156

13 Claims. (Cl. 138—50)

This invention relates to expansion joints and more particularly to expansion joints having resilient expansible and contractible walls.

An object of the present invention is to provide an expansion joint which is relatively inexpensive, simple in construction, and easily fabricated. Another object is to provide an expansion joint which is capable of being readily inspected and, if necessary, easily repaired. A further object of this invention is to provide an expansion joint having flexure stress characteristics superior to conventional bellows type expansion joints.

The present invention contemplates an expansion joint which comprises a plurality of corrugated or pleated walls. Each wall has a plurality of longitudinally extending corrugations or pleats. The corrugated walls are arranged in relationship to each other with the inner edges of the end portions of the walls in abutment with each other so that spaces are defined between the ends of the corrugations of a wall and the ends of the corresponding corrugations of the abutting wall. A corner member having two segments joined together along one edge and extending therefrom in diverging planes is positioned in each of the spaces defined by the juxtaposed corrugations of the abutting walls. The segments of each corner member are secured to the legs of the juxtaposed corrugations to connect the corrugated walls together and thereby form a closure.

A cover assembly is disposed to enclose each of the corrugated walls. Each of the cover assemblies comprise cover members which are connected to the corrugated wall associated therewith and are constructed and arranged to slidably engage each other.

An expansion joint according to another embodiment of the present invention has a plurality of walls each of which comprises a plurality of corner members arranged to provide a plurality of corrugations or pleats. The corner members of the walls are secured to the corresponding corner members of an adjacent wall by other corner members to form a joint which in plan view has a polygonal configuration.

The invention will be more fully understood from the following description when considered in connection with the accompanying drawings wherein two embodiments of the invention are illustrated by way of example, and in which.

Figure 1:
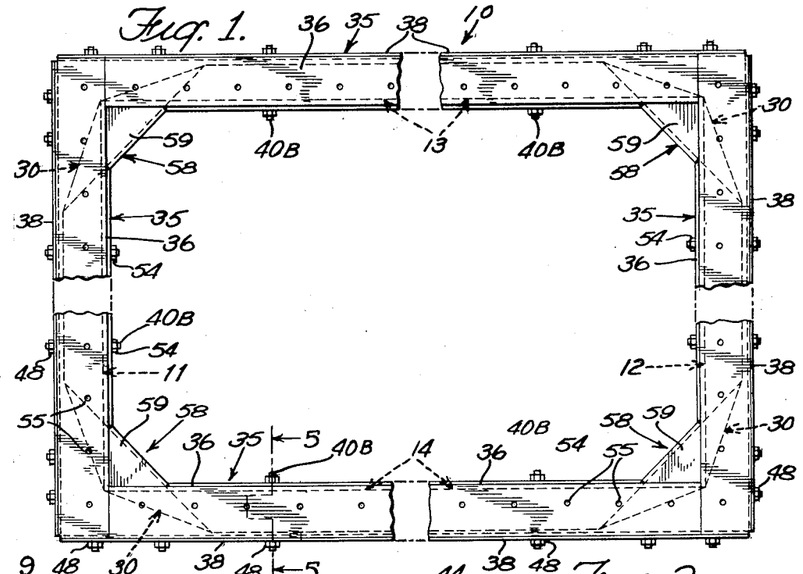
Fig. 1 is a plan view of an expansion joint according to the present invention.
Figure 2:
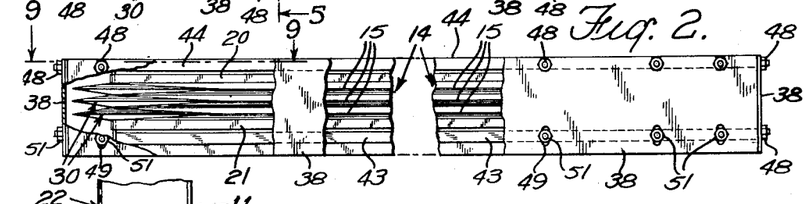
Fig. 2 is a view in elevation of the expansion joint with part of the cover structure broken away for illustration purposes.

Referring to the drawings and more particularly to Figs. 1 and 2, 10 designates an expansion joint assembly, according to the present invention, for connecting two fluid ducts together, as for example, gas or air ducts (not shown). Assembly 10 comprises identical flexible end walls 11 and 12 and opposite identical flexible side walls 13 and 14, the walls being of relatively thin metal. Each side wall 13 and 14 is provided with a plurality of longitudinally extending substantially V-shaped corrugations or pleats 15 preferably having substantially straight diverging portions 16 and 17 integrally joined by substantially curved portions 18 (see Fig. 5). Each V-shaped corrugation 15 is integrally joined to the next adjacent corrugation 15 by a substantially curved portion 19 extending between portion 17 of one corrugation 15 and the portion 16 of the next adjacent corrugation 15. Portion 16 of the uppermost corrugation 15 is provided with an upwardly extending integral flange portion 20 and portion 17 of the lowermost corrugation 15 is provided with a downwardly extending flange portion 21. Flange portions 20 and 21 extend parallel to the axis of the assembled expansion joint and lie in substantially the same vertical plane with the curved portions 19.

Figure 4:
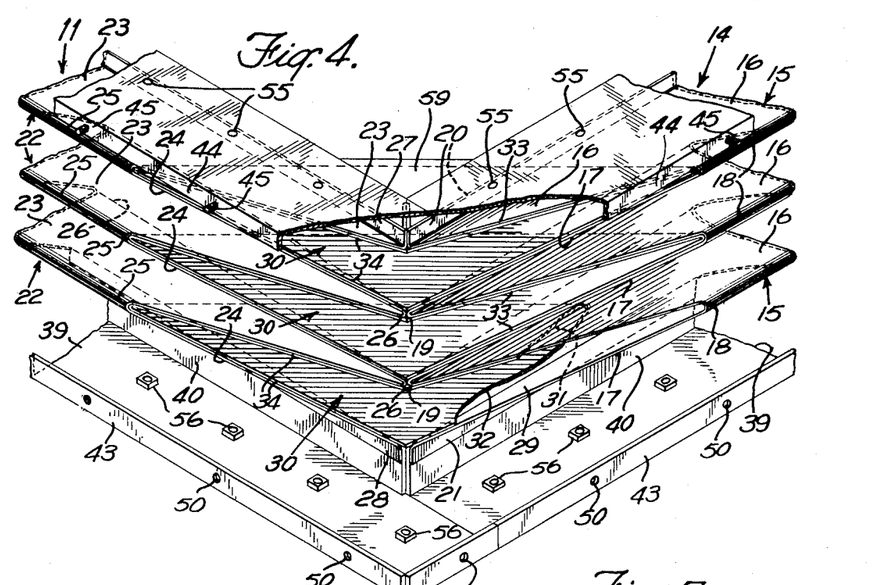
Fig. 4 is an isometric view of a corner of the expansion joint with the outer cover plate removed.

As shown, end walls 11 and 12 are identical in construction to side walls 13 and 14 except that the lengths of the end walls may differ from the length of the side walls. As best shown in Fig. 4, each end wall is provided with the same number of longitudinally extending V-shaped corrugations or pleats, designated by the numeral 22, as side walls 13 and 14. V-shaped corrugations 22 of side walls 11 and 12 have substantially straight diverging portions 23 and 24 integrally joined by substantially curved portions 25, which portions correspond to diverging portions 16 and 17 and curved portions 18 of side walls 13 and 14. A V-shaped corrugation 22 is integrally joined to the next adjacent V-shaped corrugation by substantially curved portions 26, corresponding to curved portions 19 of side walls 13 and 14. Portions 23 of the uppermost corrugations 22 and the portion 24 of the lowermost corrugation 22 are respectively provided with flange portions 27 and 28 (Fig. 8) corresponding to flange portions 20 and 21 of side walls 13 and 14.

Each side wall 13 and 14, at curved portions 18, is shorter in length than at curved portions 19 and flanges 20 and 21 so that the opposite ends of corrugations 15 lie in vertical planes which form acute angles with the vertical plane in which curved portions 19 and flanges 20 and 21 lie. Similarly, each end wall 11 and 12, at curved portions 25, is shorter in length than at curved portions 26 and flanges 27 and 28 so that the opposite ends of corrugations 22 lie in vertical planes which form acute angles with the vertical plane in which curved portions 26 and flanges 27 and 28 lie.

Side walls 13 and 14 and end walls 11 and 12 are disposed to extend normal to each other, as best shown in Fig. 1, with their opposite ends in abutment. As best shown in Fig. 4, the abutting ends of side walls 13 and 14 and end walls 11 and 12 are secured together, as by welding, along the ends of the adjacent flanges 20 and 27, at the end of adjacent curved portions 19 and 26, and along the ends of flanges 21 and 28 so that a plurality of spaces 29 are defined by the juxtaposed corrugations 15 and 22 of each pair of adjacent end and side walls. A corner member 30, hereinafter more fully described, is positioned in each space 29 formed between juxtaposed corrugations 15 and 22 to thereby join the corrugations of the side and end walls together.

Figure 6:
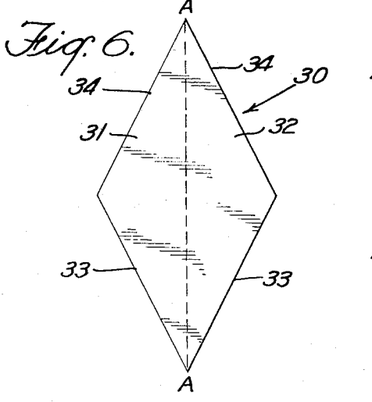
Fig. 6 is a plan view of a corner member prior to folding.
Figure 7:
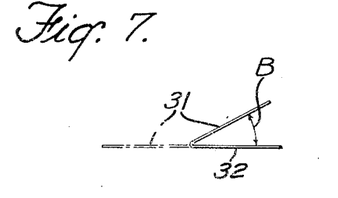
Fig. 7 is a side view of the corner member after folding.

Corner members 30, as best illustrated in Figs. 6 and 7, are each preferably formed from a rhombus-shaped metal sheet or plate of substantially the same thickness as side and end corrugations 15, 22, which plate is folded along the longer diagonal line, indicated at A—A (Fig. 6), to form two isosceles triangular segments 31 and 32 extending at an acute angle with respect to each other (see Fig. 7). Corner members 30 are dimensioned so that the free edges 33 and 34 of each segment 31 and 32 having a length substantially corresponding to the length of the end edges of portions 16 and 17 and portions 23 and 24, respectively. The angle between the segments 31 and 32, indicated at B in Fig. 7, is substantially equal to the angle of divergence of portions 16, 17 and 23, 24 of V-shaped corrugations 15 and 22 so that the free edges 33 and 34 of the segments 31 and 32 contact and are coextensive with the end edges of portions 16, 17 and 23, 24.

Each corner member 30, as shown, is disposed in a space 29 with the fold edge A—A lying between portions 16, 17 and 23, 24 and segments 31 and 32 extending outwardly to contact the end edges of portions 16, 17, 23 and 24 along free edges 33 and 34. Segments 31 and 32 of each corner member 30 are secured along their free edges 33 and 34 to the end edges of portions 16, 17 and 23, 24 of V-shaped corrugations 15 and 22, as for example by welding, to thereby secure side walls 13, 14 and end walls 11, 12 together in a fluid-tight manner.

Figure 5:
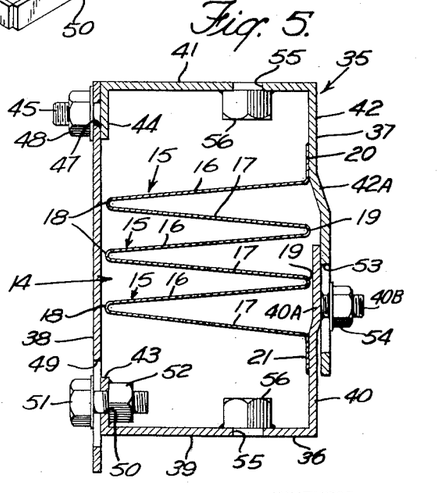
Fig. 5 is a view in section taken on line 5—5 of Fig. 1, somewhat enlarged.
Figure 8:
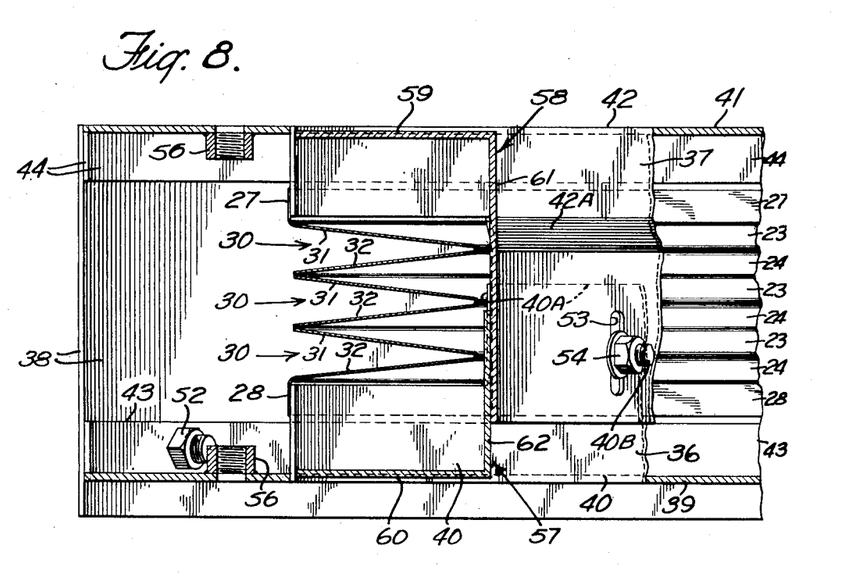
Fig. 8 is a sectional view taken along line 8—8 of Fig. 3, somewhat enlarged.

A cover assembly 35 is arranged to surround each side wall 13 and 14 and each end wall 11 and 12 to protect the walls from accidental damage and overstraining. As shown in Figs. 5 and 8, each of the cover assemblies 35 comprises two longitudinally extending cover members 36 and 37 which are substantially L-shaped in cross section, and a flat outer plate member 38 which is connected to cover members 36 and 37. Since cover assembly 35 for walls 11, 12, 13 and 14 are of similar construction and the cooperative relation of each cover assembly 35 with the wall associated therewith is the same, only cover assembly 35 for side wall 14 will be hereinafter described in detail.

As best shown in Fig. 5, cover member 36 of side wall 13 is disposed with its horizontal leg 39 underlying and spaced from the lowermost corrugation 15 and its vertical leg 40 extending adjacent curved portions 19 of the corrugations. Leg 40 is slightly offset at 40A so that its inner surface is spaced from curved portions 19. Cover member 37 of cover assembly 35 is disposed with its horizontal leg 41 overlying and spaced from the uppermost V-shaped corrugation 15 and its vertical leg 42 extending adjacent curved portions 19. Vertical leg 42 is offset at 42A to overlap a substantial portion of leg 40 of cover member 36. Flange 21 of the lowermost corrugation 15 is secured, as by welding, to vertical leg 40 of cover member 36 while flange 20 of the uppermost corrugation 15 is secured, as by welding, to vertical leg 42 of cover member 37.

Horizontal legs 39 and 41 of cover members 36 and 37, respectively, are provided with flanged end portions 43 and 44, respectively, against which plate 38 is disposed. To flange 44 are secured a plurality of spaced studs 45 which pass through holes 47 in plate 38. Studs 45 are threaded to receive nuts 48 whereby the upper portion of plate 38 is secured to flange 44. Plate 38, adjacent flange 43 of cover member 36, is provided with a plurality of longitudinally spaced vertically extending slots 49, which slots are in register with a plurality of longitudinally spaced holes 50 in flange 43. A bolt 51 is passed through each registered slot 49 and hole 50 and is turned onto a nut 52 to hold the lower portion of plate 38 against flange 43 of cover member 36. Nuts 52 are secured, as by welding, to flange 43 adjacent holes 50 because the cover members 36 and 37 are of relatively thin metal, as for example 11 gage, and, therefore, do not provide sufficient thickness for threading. Vertical leg 40 of cover member 36 has a plurality of outwardly extending threaded studs 40B, each of which extend through an elongated vertically extending slot 53 in leg 42 of cover member 37. A nut 54 is turned down upon stud 40B whereby leg 42 of cover member 37 is held against leg 40 of cover member 36. Bolts 51 are turned into nuts 52, and nuts 54 are turned upon studs 40B sufficiently tight to prevent lateral movement between flange 43 and plate 38 and between leg 40 and leg 42, respectively, but not tight enough to prevent relative vertical movement between cover members 36 and 37.

The horizontal legs 39 and 41 of cover members 36 and 37, respectively, have a plurality of longitudinally spaced mounting bolt holes 55, over which holes are welded nuts 56. Bolts (not shown) are threaded into nuts 56 to connect the expansion joint assembly 10 to duct members and/or other associated parts (not shown), as where the assembly is employed as an expansible furnace bottom.

As best shown in Figs. 1, 4 and 8, the opposite ends of legs 39 and 41 of the respective cover members 36 and 37 which form a part of cover assemblies 35 for side walls 13 and 14, extend the length of flanges 20 and 21 of corrugations 15. Legs 39 and 41 of cover members 36 and 37, respectively, which cover members form a part of cover assemblies 35 for end walls 11 and 12, extend beyond the ends of flanges 27 and 28 of corrugations 22 and terminate at flanges 43 and 44 of cover assemblies 35 of side walls 13 and 14. The opposite ends of offset portions 42A of legs 42 of cover assemblies 35 for side walls 13 and 14 terminate at the point where the fold edges of corner members 30 intersects the vertical plane of curved portions 19 of corrugations 15, while the upper portions (above offset portions 42A) extend to a point adjacent the ends of flanges 20 (see Fig. 9). Likewise, the opposite ends of offset portions 42A of legs 42 of cover assemblies 35 for end walls 11 and 12 terminate at the point where the fold edges of corner members 30 intersects the vertical plane of curved portions 26 of corrugations 22 while the upper portions of legs 42 extend to a point adjacent the ends of flange 27. Similarly, the opposite ends of offset portions 40A of legs 40 of cover assemblies 35 for side walls 13 and 14 terminate at the intersection of the fold edges of corner members 30 and the vertical plane of curved portions 19 of corrugations 15, while the lower portions (below offset 40A) extend to a point adjacent the ends of flanges 21 of corrugations 15 (see Fig. 8). Likewise, the opposite ends of offset portions 40A of legs 40 of cover assemblies 35 for end walls 11 and 12 terminate at the point where the fold edges of corner members 30 intersects the vertical plane of curved portions 26 of corrugations 22 while the lower portions of legs 40 extend to a point adjacent the ends of flange 28.

Figure 3:
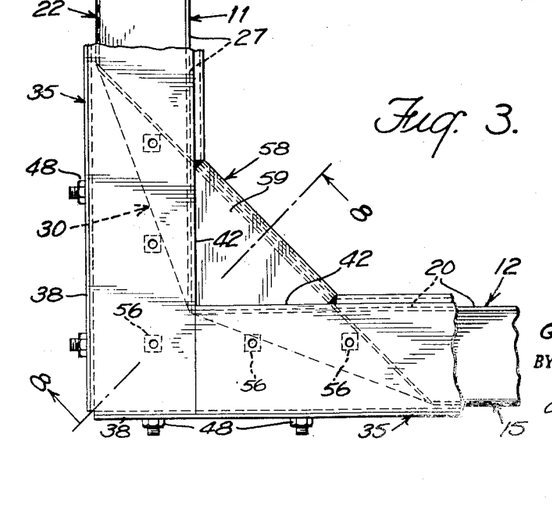
Fig. 3 is a fragmentary view of one of the corners of the expansion joint, somewhat enlarged.
Figure 9:
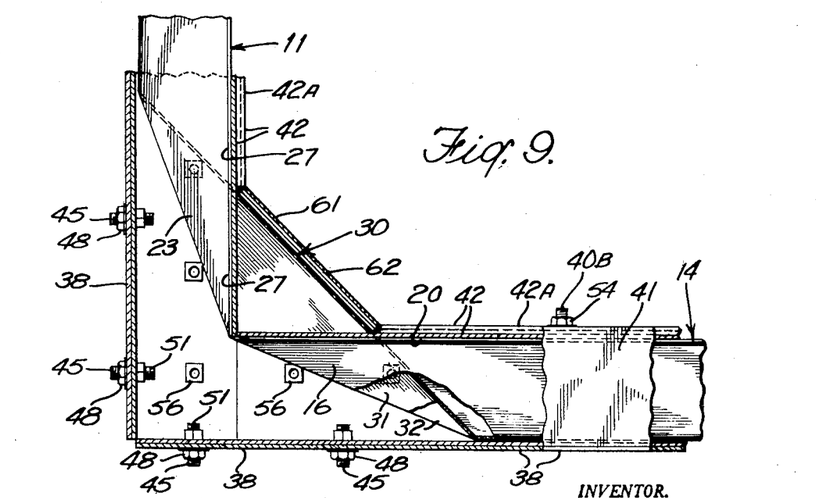
Fig. 9 is a view in section taken along 9—9 of Fig. 2, somewhat enlarged.
Figure 10:
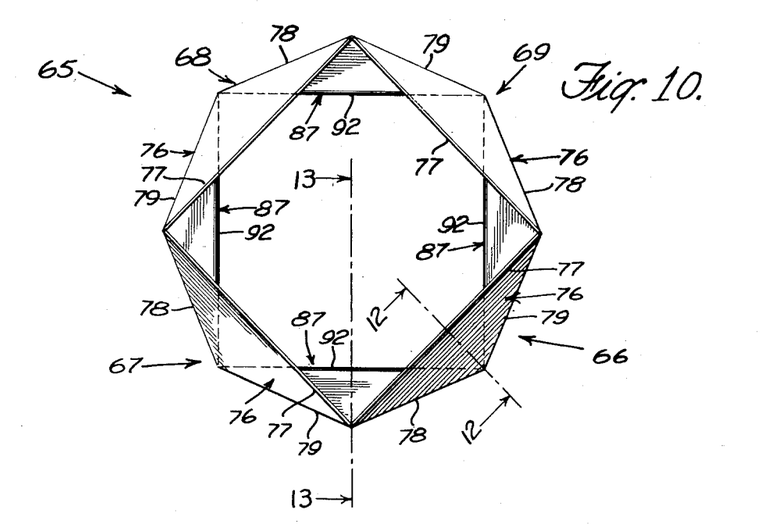
Fig. 10 is a plan view of an expansion joint according to a second embodiment of the present invention.

Corner members 30 of each corner of expansion joint 10 is covered by two L-shaped members 57 and 58, as best illustrated in Figs. 3, 8 and 9. The horizontal leg 59 of member 58 overlies the uppermost corner member 30 and is triangular in configuration and dimensioned so as to abut the upper portion of legs 42 of adjacent cover assemblies 35. The horizontal leg 60 of member 57 underlies the lowermost corner member 30 and is also triangular in shape and dimensioned to abut the lower portion of legs 40 of the adjacent cover assemblies. Vertical leg 61 of member 58 and vertical leg 62 of member 57 are in abutment with legs 40 and 42, respectively, of cover assemblies 35 of abutting walls 11, 12, 13, and 14. Legs 61 and 62 of members 57 and 58 overlap each other. Member 58 is secured, as by welding, to cover members 37 where horizontal leg 59 and vertical leg 61 abut adjacent legs 42 of cover members 37, while member 57 is secured, as by welding, to the cover members 36 where horizontal leg 60 and vertical leg 62 abut adjacent legs 40 of cover members 36. Since members 57 and 58 are secured to cover members 36 and 37, respectively, they will move vertically relative to each other as cover members 36 and 37 move relative to each other.

As shown in Figs. 1, 3 and 9, each plate 38 extends the full length of the wall it is associated with so that the opposite end of each plate is adjacent the end of a plate 38 of the adjacent walls.

Since the cover members 36 and 37 are secured to the V-shaped corrugations 15 and 22 of side walls 13 and 14 and end walls 11 and 12, expansion or contraction of the walls will cause cover members 36 and 37 to move relative to each other and bolts 51 and studs 40B to move within their respective slots 49 and 53. In the event extension or compression of the expansion joint assembly 10 approaches a point at which overstraining or failure of the corrugated sections of walls 11, 12, 13 and 14 may occur, bolts 51 and studs 40B strike the ends of slots 49 and 53, respectively, thus limiting the extent of flexure of the expansion joint and preventing overstraining and the consequent rupture of the corrugated walls.

For providing an expansion joint, according to this invention, of greater expansion duty, each of the walls may be constructed by simply disposing two similar corrugated walls of the present invention having the same length one above the other and joining them together. As for example, each side wall of the expansion joint may be constructed of two walls 14 disposed one above the other with flange 20 of the lower wall 14 secured, as by welding to flange 21 of the upper disposed wall 14. Similarly, each end wall of the expansion joint may be constructed by two end walls 11 disposed one above the other with flange 27 of lower wall 11 secured, as by welding, to flange 28 of the upper disposed wall 11. The side and end walls thus constructed have a greater number of corrugations or pleats, and, therefore, provide greater expansion duty. The cover assembly 35 for each wall is of the same construction as hereinbefore described, but is of larger dimensions.

As can now be readily understood from the foregoing description, the expansion joint is easily fabricated since all the component parts thereof are readily accessible for welding. The V-shaped corrugations 15 and 22 and corner members 30 of the expansion joint and the joints between these parts are conveniently available for inspection and repair. If the expansion joint is provided with cover assemblies 35, inspection and repair is easily accomplished after simply removing plates 38. Furthermore, the novel corner construction of the expansion joint according to this invention, has substantially lower flexure stress concentrations than the corner construction of presently known expansion joints so that fewer corrugations or pleats are necessary in the walls than in conventional expansion joints for the same expansion duty. In addition, the expansion joint corner construction, as compared with other similar types of expansion joints, is more flexible and, thus, imposes lower stress forces on the associated structures to which it is attached.

While the expansion joint has been described and illustrated with cover assemblies associated therewith, it is to be understood that cover assemblies 35 may be omitted and flanges 20, 21 and flanges 27, 28 of corrugations 15 and 22 may be connected directly to associated structures in a suitable manner, as for example, by bolts passing through holes provided in the aforesaid flanges.

An expansion joint 65, according to another embodiment of the present invention, is shown in Figs. 10 through 14. This embodiment differs from the expansion joint hereinbefore described and illustrated in Figs. 1 through 9 in that expansion joint 65 has no straight-corrugated side and end walls 11, 12, 13 and 14 which form a part of the embodiment shown in Figs. 1 to 9. Expansion joint 65 is constructed substantially of corner members according to this invention hereinbefore described and designated by the reference numeral 30.

Expansion joint 65 is particularly adapted for connection between circular ducts and for providing fluid-tight seals around pipes at the joints between the pipes and walls, such as bulkheads or casing walls, through which the pipes extend. An advantage of this embodiment, where the expansion joint is employed as a seal between a pipe and a wall through which the pipe extends, is that installation thereof can be accomplished by construction of the expansion joint around the pipe and then connecting the joint to the pipe and wall. Heretofore, similar expansion joints were installed by first withdrawing the pipe from the walls and then passing the assembled expansion joint over the end of the pipe because the expansion joints could not be constructed around the pipe. Furthermore, an expansion joint according to this embodiment, where it is employed as a seal around a pipe, can be inspected, repaired or replaced without disturbing the pipe or its connections with other parts. Other features and advantages of expansion joint 65 will be apparent after its construction is fully understood from the following description when considered in connection with Figs. 10 to 14.

Figure 11:
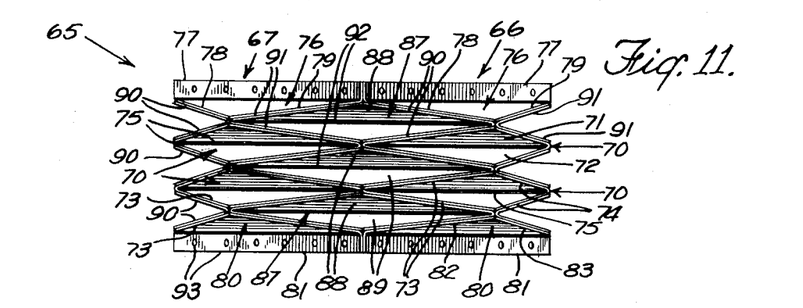
Fig. 11 is a view in elevation of the expansion joint shown in Fig. 10.
Figure 12:
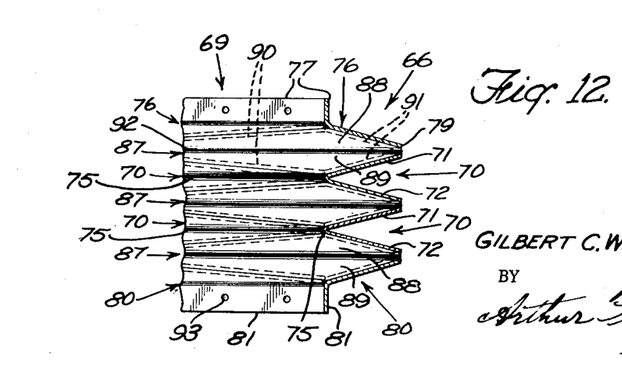
Fig. 12 is a view in section, taken substantially along line 12—12 of Fig. 10, somewhat enlarged.
Figure 13:
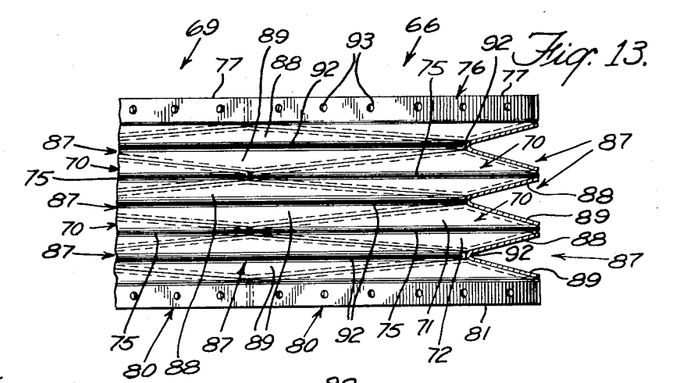
Fig. 13 is an enlarged sectional view taken along line 13—13 of Fig. 10.

As best shown in Figs. 11 and 12, expansion joint 65 has four contiguous equal length walls 66, 67, 68 and 69, which walls are disposed to extend normal to each other. Each of the walls 66, 67, 68 and 69 comprises two corner members 70 which are of similar construction to corner members 30 hereinbefore described and shown in Figs. 6 and 7. Each corner member 70 is preferably formed from a rhombus-shaped metal plate to provide two triangular segments 71 and 72 each of which have two free edge portions 73 and 74 and a common "fold" edge 75, "fold" edge 75 being formed by folding the plate, as shown in Fig. 7. Corner members 70 of each wall are arranged one above the other with segments 71 and 72 extending from the "fold" edges 75 in a direction away from the longitudinal axis of the expansion joint and with their respective free edges 73 and 74 lying in the same vertical plane and their respective "fold" edges 75 lying in the same vertical plane. Corner member 70 of each wall 66, 67, 68 and 69 is secured to the corresponding corner member 70 of the juxtaposed wall at the ends of the "fold" edges 75. Each wall 66, 67, 68 and 69, also includes a triangular-shaped element 76 which corresponds substantially in size to segments 71, 72 of corner members 70. Element 76 has a vertically extending flange 77 along one of its edges and is disposed above the uppermost corner member 70 with flange 77 lying in the same vertical plane as "fold" edges 75 of corner members 70 and its other two edge portions 78 and 79 lying, respectively, in the same vertical planes as free edges 73 and 74 of corner members 70. Each wall further includes a triangular-shaped element 80 (see Figs. 12 and 14), similar to element 76 and also corresponds substantially in size to segments 71, 72 of corner members 70. Element 80 has a vertically extending flange 81 along one of its edges and is disposed below the lowermost corner member 70 with its other two edges 82 and 83 lying, respectively, in the same vertical planes as free edges 73 and 74 of corner members 70. Flanges 77 of each of the walls is secured to flange 77 of the adjacent walls along the opposite end edges of the flanges, while flange 81 of each of the walls is secured to flanges 81 of the adjacent walls along the opposite end edges of the flanges.

Figure 14:
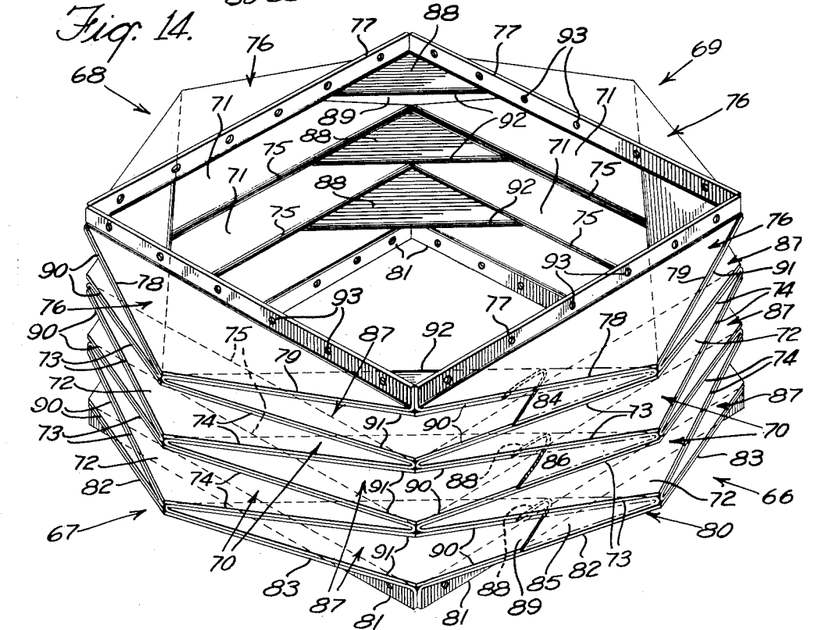
Fig. 14 is a perspective view of the expansion joint shown in Figs. 10 to 13 with some corner members broken away for illustration purposes.

Walls 66, 67, 68 and 69, constructed and arranged in relation to each other as aforedescribed, define therebetween a plurality of spaces. As best shown in Fig. 14, an uppermost space 84 is defined by edge 78 of element 76 of one wall and edge 79 of element 76 of an abutting wall, and by edge 73 of an upper corner member 70 and edge 74 of the corresponding corner member of an adjacent wall. A lowermost space 85 is defined by edge 82 of element 80 of one wall and edge 83 of element 80 of an abutting wall, and by edge 73 of a lower corner member 70 and edge 74 of the corresponding corner member 70 of an adjacent wall. An intermediate space 86 is defined by edges 73 of adjacent corner members 70 of one wall and edges 74 of adjacent corner member 70 of an abutting wall.

A corner member 87, similar in size and configuration to corner members 70 of walls 66, 67, 68 and 69, is disposed in each of the spaces 84, 85 and 86 formed between each of the abutting walls. Each corner member 87 is formed by folding a rhombus-shaped plate, in the same manner as aforedescribed with respect to corner members 30, to form two triangular segments 88 and 89 each of which have two free edge portions 90 and 91 and a common "fold" edge 92.

Corner members 87 are positioned in spaces 84 with their segments 88 and 89 extending from "fold" edges 92 in a direction away from the longitudinal axis of the expansion joint so that edge portions 90 and 91 lie in contact and are coextensive with edges 78 and 79 of elements 76 and edges 73 and 74 of upper corner members 70. Corner members 87 are arranged in the intermediate spaces 86 with their segments 88 and 89 extending from "fold" edges 92 in a direction away from the longitudinal axis of the joint so that edge portions 90 and 91, respectively, lie in contact and are coextensive with edges 73 and 74 of the corner members 70. In spaces 85, corner members 87 are positioned with their segments 88 and 89 extending from "fold" edges 92 in a direction away from the longitudinal axis of the expansion joint so that edge portions 90 and 91 lie in contact and are coextensive with edges 82 and 83 of segments 80 and edges 73 and 74 of lower corner members 70. Corner members 87 are secured, as by welding, in their respective spaces 84, 85 and 86 to elements 76 and 80, and corner members 70 along their aforedescribed coextensive edges, and each corner member 87 is secured to the corresponding corner members 87, disposed in the adjacent spaces, at the opposite end portions of the "fold" edge 92, thereby providing a fluid-tight flexible expansion joint assembly.

Flanges 77 and 81 are provided with a plurality of longitudinally spaced holes 93 adapted to receive bolts (not shown) for mounting the expansion joint to associated parts. Flanges 77 and flanges 81 may be respectively suitably secured, as by bolting or welding, to an adapter member (not shown) having means for connecting the adapter member to circular members, such as the ends of cylindrical ducts.

Although expansion joint 65 has been described and illustrated as having an octagonal configuration (see Fig. 10), it is not limited thereto. By change in geometry of corner members 70 and 87 and elements 76 and 80 and the number of these parts, an expansion joint according to this embodiment may have more than four walls without departing from the spirit and scope of the present invention. For example, the expansion joint may have five or six walls, in which case the expansion joint would have, respectively, a decagonal or dodecagonal configuration. Although the corner members have been described as fastened by welding or other suitable means to the pleated wall, it is contemplated that corner members and the wall may be fabricated by folding a single sheet or plate so that a pleated wall having integral corner members is provided.

Although two embodiments of the present invention have been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. An expansion joint assembly comprising a plurality of corrugated walls disposed to extend in angular relationship with each other and with the end portions of the corrugated walls disposed adjacent each other, each of the corrugated walls comprising a plurality of connected V-shaped sections, a plurality of connecting members each of which include two diverging triangular segments joined together along one edge, each connecting member being connected to a V-shaped section of a corrugated wall and to the corresponding V-shaped section of the adjacent corrugated wall to thereby connect the corrugated walls to each other, a housing for each of said corrugated walls, each housing including a first cover member and a second cover member disposed to overlie each of said corrugated walls, said first cover and second cover members slidably engaging each other, the opposite endmost V-shaped sections of each corrugated wall being respectively secured to the first and second cover members, said first and second cover members having means for limiting relative movement between the first and second cover members under the urging of the corrugated walls to thereby limit movement of the latter.

2. The expansion joint of claim 1 wherein the means comprises a stop member secured to the first cover member and extending into a slot in the second cover member.

3. An expansion joint assembly comprising a plurality of corrugated walls disposed to extend in angular relationship with each other and with the end portions of the corrugated walls disposed in abutment with each other, each of the corrugated walls comprising a plurality of connected V-shaped sections disposed one above the other, a plurality of corner members, each corner member including two congruent triangular segments joined together along one edge and extending in diverging planes, the triangular segments of each corner member being connected to a V-shaped section of a corrugated wall and to the corresponding V-shaped section of the abutting wall to thereby connect the corrugated walls together, a closure structure including a substantially U-shaped cover member and an inverted substantially U-shaped cover member overlying each of the corrugated walls, each of said cover members constructed and arranged to overlap and slidably engage each other at their leg portions, the topmost V-shaped section being connected to the inverted U-shaped cover member and the lowermost V-shaped section being connected to the U-shaped cover member, stop members carried by one of said cover members, slots in the other of said cover members, each of said slots being adapted to receive therein one of said stop members to thereby limit relative movement between the cover members under the urging of the corrugated wall associated therewith to thereby limit movement of the corrugated wall.

4. An expansion joint of the class described, comprising a plurality of walls, each wall having a plurality of flexible-triangular segments, each of said flexible segments having a base edge portion, said flexible segments of each wall being arranged in alternate converging and diverging relationship, said walls being disposed with their opposite ends in abutment at the ends of the bases of the triangular segments to define between each abutting wall a plurality of spaces, and a flexible member receivable in each space, each of said flexible members being connected to a portion of each of two adjacent segments of one wall and a portion of each of two corresponding adjacent segments of an abutting wall.

5. An expansion joint of the class described, comprising a plurality of walls, each wall having a plurality of triangular-shaped segments, each segment having a base edge and two side edge portions, said segments of each wall being arranged in alternate converging and diverging relationship with the base edge portions lying in the same plane, said walls being disposed with their opposite ends in abutment at the ends of the base edge portions of the triangular segments of the walls so that spaces are defined between side edge portions of adjacent segments of one wall and the side edge portions of adjacent segments of an abutting wall, and a connecting member having two diverging triangular-shaped segments adapted for insertion in each of said spaces, the triangular segments of each connecting member being connected to adjacent side edge portions of two adjacent segments of one wall and to adjacent side edge portions of two adjacent segments of an abutting wall.

6. An expansion joint of the class described, comprising a plurality of walls, each wall having a plurality of triangular-shaped segments, each segment having a base edge and two side edge portions, said segments of each wall being arranged in alternate converging and diverging relationship with the base edge portions lying in the same plane, said walls being disposed with their opposite ends in abutment at the ends of the base edge portions of the triangular segments of the walls so that spaces are defined between side edge portions of adjacent segments of one wall and the side edge portions of adjacent segments of an abutting wall, and a corner member for each of said spaces, each of said corner members comprising two triangular-shaped segments connected along one edge and extending therefrom in diverging planes to provide two pair of free edge portions, each corner member being connected along the one pair of free edge portions of the triangular segments thereof to adjacent side edge portions of two adjacent segments of one wall and along the other pair of free edge portions to adjacent side edge portions of two adjacent segments of an abutting wall.

7. An expansion joint of the class described, comprising a plurality of corrugated walls disposed in angular relationship with each other to form an enclosure, each wall being formed by a plurality of longitudinally extending V-shaped sections disposed adjacent each other with the apices of the V-shaped sections lying in a plane outwardly disposed with respect to said enclosure and the longitudinal edges of the legs of the V-shaped sections lying in a plane inwardly disposed with respect to said enclosure, the adjacent V-shaped sections of a wall being connected along the inner longitudinal edges of their legs, the corrugated walls being disposed in abutment with each other at the ends of the inner edge portions of the legs of the V-shaped sections so that between each V-shaped corrugation of one wall and the corresponding V-shaped section of an abutting wall a space is defined, a plurality of corner members, each corner member comprising two congruent triangular segments joined together along one edge and extending along diverging planes, a corner member being disposed in each of said spaces and the triangular segments of the corner member being connected to the V-shaped sections of the corrugated wall to thereby connect the corrugated walls together.

8. An expansion joint comprising a plurality of corrugated walls disposed in angular relationship with each other to form an enlcosure, each of the walls having an equal number of symmetrically arranged V-shaped sections, the V-shaped sections being disposed with the apices of the V-shaped sections of a wall extending in a plane outwardly disposed with respect to said enclosure and the edge portions of the legs of the V-shaped sections extending in a plane inwardly disposed with respect to said enclosure, said V-shaped section of each wall being interconnected along the inner edge portions of their legs, the corrugated walls being disposed in abutment with each other at the ends of the inner edge portions of the legs of the V-shaped sections so that a space is defined between each V-shaped section of one wall and a V-shaped section of an abutting wall, a corner member for each space, each corner member consisting of two substantially planar elements connected together and diverging from each other, each of said planar elements being constructed and arranged to extend in each of said spaces defined between the V-shaped section of a wall and the corresponding V-shaped section of the adjacent wall, the planar elements of each of said corner members being connected to the aforementioned pairs of juxtaposed V-shaped sections to thereby secure the corrugated walls together.

9. An expansion joint comprising a plurality of corrugated walls disposed in angular relationship to each other to define an enclosure, each of the walls having a plurality of integral longitudinal V-shaped sections arranged with apices of the V-shaped sections extending in a plane outwardly disposed with respect to said enclosure and the edge portions of the legs of the V-shaped sections extending in a plane inwardly disposed with respect to said enclosure, said corrugated walls being disposed with the ends thereof in abutment with each other at the ends of the inner edge portions of the legs of the V-shaped sections of the walls to define a space between the end of each V-shaped section of a corrugated wall and the end of the corresponding V-shaped section of the abutting wall and a corner member insertable in each of the spaces defined by corresponding juxtaposed V-shaped sections, each corner member comprising two congruent triangular segments joined together along one edge and extending in diverging planes, each of the triangular segments of a corner member being secured to a leg of a V-shaped section of a wall and the corresponding leg of the corresponding V-shaped section of the abutting wall to thereby connect the abutting walls together.

10. An expansion joint comprising four walls, said walls being disposed in angular relationship to each other to define an enclosure, each wall being formed with the plurality of longitudinally extending V-shaped sections disposed one above the other with the apices of the V-shaped sections extending in a plane outwardly disposed with respect to said enclosure and the edge portions of the legs of the V-shaped sections extending in a plane inwardly disposed with respect to said enclosure, each wall having an equal number of V-shaped sections, the walls being disposed normal to each other and with the ends of the walls in abutment with each other at the ends of the inner edge portions of the legs of the V-shaped section to define spaces between the ends of the V-shaped sections of a wall and the ends of corresponding V-shaped sections of an abutting wall, and a corner member insertable in each of the spaces defined by corresponding juxtaposed V-shaped sections, each corner member comprising a rhombus shaped plate folded along the longer diagonal to form two isosceles triangular segments extending in diverging planes, the triangular segments of each corner member being secured to the legs of a V-shaped section of a wall and to the juxtaposed V-shaped section of the abutting wall to thereby join the abutting walls together.

11. An expansion joint of the class described, comprising a plurality of walls arranged in angular relationship with each other to define an enclosure, each wall having a plurality of longitudinally extending flexible corrugations with the folds of the corrugations of each wall extending in planes outwardly and inwardly disposed with respect to said enclosure, the walls being disposed with the opposite ends of each wall in abutment with two other walls at the ends of the folds lying in planes inwardly disposed with respect to said enclosure so that spaces are defined between the corrugations of one wall and the corresponding corrugations of an abutting wall, and a flexible connecting member for each space, each of said flexible connecting members consisting of two substantially planar elements connected together and diverging from each other, each flexible connecting member being disposed in a space and with the planar elements connected together and diverging from each other, each flexible connecting member being disposed in a space and with the planar elements connected to the corrugation of one wall and the corrugation of the adjacent wall defining said space.

12. An expansion joint of the class described, comprising a plurality of flexible walls disposed in angular relationship with respect to each other to define an enclosure, each of said flexible walls having at least one substantially V-shaped corrugation disposed with the apex thereof extending in a plane outwardly disposed with respect to said enclosure and the edge portions of the legs of the V-shaped corrugation extending in a plane inwardly disposed with respect to said enclosure, the flexible walls being disposed with the ends thereof in abutment with each other at the ends of the edge portions of the legs of the V-shaped corrugations so that a V-shaped corrugation of one wall and a V-shaped corrugation of the adjacent wall defined a space, and a flexible connecting member for each space, each of said flexible connecting members consisting of two planar elements connected together and diverging from each other, each flexible connecting member being disposed in a space and with the planar elements connected to the V-shaped corrugation of one wall and the V-shaped corrugation of the adjacent wall defining said space.

13. An expansion joint of the class described comprising a plurality of flexible walls disposed in angular relationship with respect to each other to define an enclosure, each of said flexible walls including a plurality of V-shaped sections disposed one above the other with the apex of each V-shaped section extending in a plane outwardly disposed with respect to said enclosure and the edge portions of the legs of each V-shaped section lying in a plane inwardly disposed with respect to said enclosure, the inner edge portions of a V-shaped section of a wall being connected to the inner edge portions of the legs of the ends adjacent V-shaped section, the length of the apices of the V-shaped sections of each of said flexible walls being shorter than the length of the inner edge portions of the legs of the V-shaped sections, the flexible walls being disposed in abutment with each other at the ends of the inner edge portions of the legs of the V-shaped sections so that each V-shaped section of one wall and the corresponding V-shaped section of the adjacent wall define a space, and flexible means adapted for insertion in each of said spaces, said means being connected to the V-shaped section of a wall and the corresponding V-shaped section of the adjacent wall defining said spaces to thereby connect the flexible walls together.

References Cited in the file of this patent

UNITED STATES PATENTS

| | | |
|---|---|---|
| 558,089 | Milburn | Apr. 14, 1896 |
| 1,944,128 | Heigh | Jan. 16, 1934 |
| 2,797,112 | Ziebold | June 25, 1957 |

FOREIGN PATENTS

| | | |
|---|---|---|
| 14,954 | Great Britain | July 20, 1905 |
| 544,805 | Great Britain | Apr. 28, 1942 |